(12) United States Patent
Chopard et al.

(10) Patent No.: US 11,174,978 B2
(45) Date of Patent: Nov. 16, 2021

(54) ASSEMBLY AND ARTICULATED PANEL WITH INTERMEDIATE POSITIONING PORTIONS, FOR THERMAL INSULATION

(71) Applicant: Hutchinson, Paris (FR)

(72) Inventors: Fabrice Chopard, Paris (FR); Paul Bline, Paris (FR); Cédric Huillet, Paris (FR); Boris Chauvet, Paris (FR); Nadine Poupa, Paris (FR); Christophe Dominiak, Paris (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 15/753,835

(22) PCT Filed: Aug. 19, 2016

(86) PCT No.: PCT/FR2016/052097
§ 371 (c)(1),
(2) Date: Mar. 14, 2018

(87) PCT Pub. No.: WO2017/029460
PCT Pub. Date: Feb. 23, 2017

(65) Prior Publication Data
US 2018/0266619 A1   Sep. 20, 2018

(30) Foreign Application Priority Data

Aug. 20, 2015  (FR) ..................................... 1557835
Aug. 20, 2015  (FR) ..................................... 1557842

(51) Int. Cl.
*F16L 59/065*  (2006.01)
*F28D 20/02*   (2006.01)
(Continued)

(52) U.S. Cl.
CPC ............ *F16L 59/065* (2013.01); *F28D 20/02* (2013.01); *F28F 13/00* (2013.01);
(Continued)

(58) Field of Classification Search
CPC ............................ F16L 59/065; F28D 20/02; F28D 2020/0008; F28D 2270/00; F28F 13/00;
(Continued)

(56) References Cited

U.S. PATENT DOCUMENTS 2,602,302 A * 7/1952 Poux .......................... F25D 3/08
62/530
3,587,578 A * 6/1971 Walker ...................... A61F 7/02
604/304
(Continued)

FOREIGN PATENT DOCUMENTS

DE          101 23 453 A1     11/2002
DE     20 2009 005 908 U1      8/2009
(Continued)

*Primary Examiner* — Tho V Duong
*Assistant Examiner* — Raheena R Malik
(74) *Attorney, Agent, or Firm* — Blank Rome LLP

(57) ABSTRACT

An assembly comprising a structure provided with an interior volume in which is present for example at least one fluid capable of circulating in said volume and under the action of circulation means. Thermally insulating elements of VIP construction are arranged around a layer containing a PCM and extending around the peripheral wall that surrounds the volume. Protrusions fixed to the peripheral wall delimited spaces in which the thermally insulating elements are positioned. A sleeve extends around the protrusions and the insulating elements.

19 Claims, 4 Drawing Sheets

(51) Int. Cl.
*F28F 13/00* (2006.01)
*F24H 1/18* (2006.01)
*F28D 20/00* (2006.01)

(52) U.S. Cl.
CPC .......... *F24D 2220/10* (2013.01); *F24H 1/182* (2013.01); *F25D 2201/14* (2013.01); *F28D 2020/0008* (2013.01); *F28F 2270/00* (2013.01); *Y02E 60/14* (2013.01)

(58) Field of Classification Search
CPC .. F28F 2270/00; F24D 2220/10; F24H 1/182; F25D 2201/14; Y02E 60/145; Y02E 60/14
USPC .......................................... 165/804, 49, 80.4
See application file for complete search history.

(56) References Cited

U.S. PATENT DOCUMENTS

| | | | | |
|---|---|---|---|---|
| 4,250,958 | A * | 2/1981 | Wasserman | F28D 20/02 126/618 |
| 5,020,481 | A * | 6/1991 | Nelson | F24H 1/182 122/19.2 |
| 5,226,557 | A * | 7/1993 | Nelson | F16L 59/024 206/523 |
| 5,441,083 | A * | 8/1995 | Korsgaard | B65D 90/06 138/147 |
| 5,505,810 | A * | 4/1996 | Kirby | B32B 27/00 156/286 |
| 5,544,490 | A * | 8/1996 | Manini | A47J 41/022 252/181.1 |
| 5,798,154 | A * | 8/1998 | Bryan | E04B 1/803 428/35.3 |
| 5,843,353 | A | 12/1998 | De Vos et al. | |
| 5,975,336 | A * | 11/1999 | Hart | B65D 81/18 220/592.16 |
| 6,244,458 | B1 * | 6/2001 | Frysinger | B65D 81/3823 220/592.09 |
| 7,013,609 | B2 * | 3/2006 | Hydock | F24D 3/142 52/220.1 |
| 7,833,605 | B2 * | 11/2010 | Tenra | E04B 1/803 428/69 |
| 2008/0308256 | A1 * | 12/2008 | Deborski | C09K 5/063 165/104.17 |
| 2010/0252698 | A1 * | 10/2010 | Dye | F16L 59/065 248/177.1 |
| 2011/0206876 | A1 * | 8/2011 | Fujimori | F16L 59/065 428/34.1 |
| 2012/0267067 | A1 * | 10/2012 | Sullivan | F24D 3/141 165/56 |
| 2014/0196867 | A1 * | 7/2014 | Sanchez | E04B 5/48 165/49 |

FOREIGN PATENT DOCUMENTS

| | | |
|---|---|---|
| EP | 1 099 646 A1 | 5/2001 |
| EP | 1 275 893 A1 | 1/2003 |
| JP | 7-91594 A | 4/1995 |
| JP | 2007-278626 A | 10/2007 |
| JP | 2008-39282 A | 2/2008 |
| JP | 2010-84813 A | 4/2010 |
| WO | WO 89/00670 A1 | 1/1989 |
| WO | WO 99/32374 A1 | 7/1999 |
| WO | WO 2011/102337 A1 | 8/2011 |
| WO | WO 2015/002505 A1 | 1/2015 |

\* cited by examiner

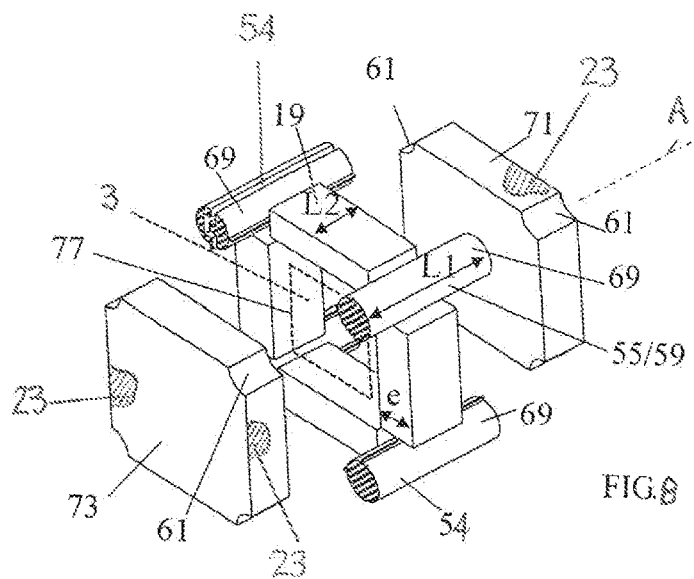
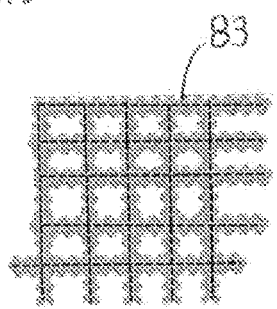
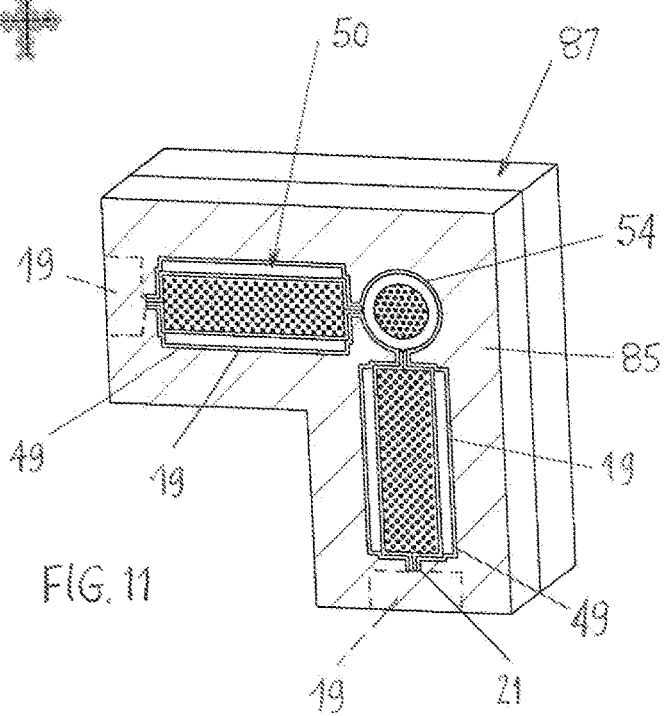

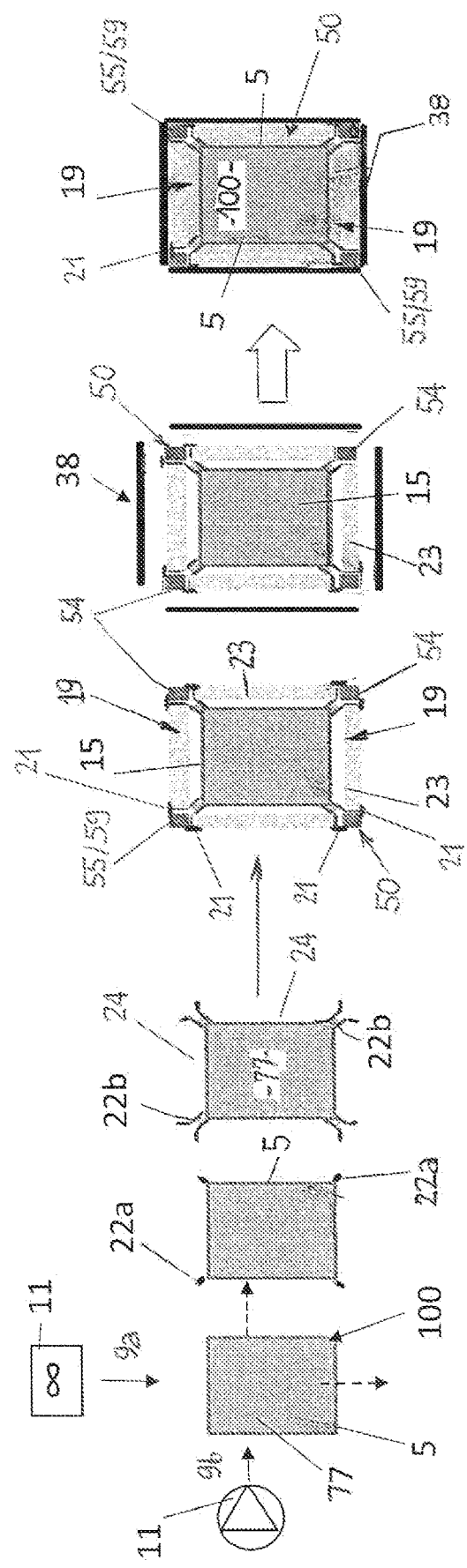

ASSEMBLY AND ARTICULATED PANEL WITH INTERMEDIATE POSITIONING PORTIONS, FOR THERMAL INSULATION

BACKGROUND OF THE INVENTION

The present invention particularly relates to an articulated panel that can be closed on itself and comprises a series of pockets under controlled atmosphere aimed at contributing to efficient thermal management.

For thermal insulation, it also relates to an assembly that uses the advantages of such a panel, which will thus be a vacuum insulation panel (VIP) construction and will facilitate the embodiment of an outer insulating case.

As for the VIPs, these are panels in which a thermal insulation (core), which may be of porous material, for example a gel/a silica powder, is for example pressed into a board and surrounded, under a controlled atmosphere, by a gastight wrapping foil. If there is a vacuum, a residual pressure of between 10 and $10^4$ Pa typically allows for the thermal conductivity to be lowered to 0.02 or even less than about 0.01 W/m–K under the conditions of use.

On this subject, in the application, "under controlled atmosphere" or "of VIP construction" will mean that the volume concerned will be either under vacuum as above, or filled with a gas having a thermal conductivity lower than that of ambient air, 26 mW/m·K. A structure under partial vacuum (and therefore an airtight enclosure) may contain at least one thermally insulating material that is in principle porous (pore sizes less than 1 micron) or even nanoporous (pore sizes less than $10^{-9}$ m).

"Porous" shall designate a material having interstices enabling the passage of air. The porous materials, with open cells, therefore include foams but also fibrous materials (such as glass wool or rock wool). The passage interstices that can be qualified as pores have sizes less than 1 or 2 mm so as to be able to guarantee a good thermal insulation, and preferably at 1 micron, and preferentially further at $10^{-9}$ m (nanoporous structure), for questions in particular of resistance to ageing and therefore possible lower negative pressure in the VIP enclosure.

And yet, VIPs do not seem to meet market expectations up until now.

Their implementation in the field is a problem, especially their manufacture if the aim is industrialised mass production, which includes their packaging.

In fact, manufacturing such a panel in a horizontal position and then closing it on itself would allow for an easy implementation of the solution "with pockets".

Moreover, there is a problem when it comes to thermally managing, and in particular thermally insulating, in a manner that can be non-planar, thus especially in corners, an interior volume (e.g. for storing a storage battery or a medicine box), a structure.

SUMMARY OF THE INVENTION

To address the above noted problems, the present invention provides an articulated panel that can be closed on itself and comprising a series of pockets under controlled atmosphere:

which individually contains at least one thermally insulating material, and which are joined together by flexible intermediate portions where two successive pockets can be articulated with respect to each other, at least some intermediate articulating portions comprising:

a tubular part defined by a thermally insulating winding or by a bulged portion enclosing a thermally insulating material in a tubular chamber under controlled atmosphere, and two parts of at least one flexible sheet, each part being interposed between said tubular part and said pocket.

Such a tubular part (whether its cross-section is circular or not) both facilitates insulation in a corner or in a change of plane and provides support for positioning, if necessary, or even mechanical structuring for corners.

To further facilitate high-performance thermal insulation, the pockets and the tubular parts are under vacuum and the contained thermally insulating materials are porous.

In addition, again to facilitate mass production and make said controlled atmosphere uniform throughout the panel, either of the following is performed:

together placing the pockets, the tubular parts and the parts of inserted (i.e. interposed) flexible sheet(s) under the same controlled atmosphere, with a single seal, only along the panel's outer periphery, or individually placing each of the pockets in this controlled atmosphere and connecting two successive pockets by the parts of flexible sheet(s), which would then surround and bind together the pockets, the tubular parts and the parts of inserted flexible sheet(s).

In both cases, the flexible sheet(s) binds together the pockets and the tubular parts, providing overall cohesion and the expected thermal management.

Furthermore, the tubular parts contain a porous thermally insulating material that is different from the thermally insulating material of the pockets.

The insulating material of the tubular parts can thus be made more flexible and that of the pockets more rigid.

Now, regarding the aforementioned "assembly", setting up, and retaining the parts that it is made of, is facilitated.

For this purpose, the assembly of the present invention includes:

the articulated panel presented above, with all or part of its characteristics; the tubular parts then having, along an axis (A) around which the panel is wound on itself, overlengths (L1-L2) which have a length over than a length (L2) of the pockets, and a bottom and a cover each incorporating or doubled by a said thermally insulating material and with concave corners engaged with said overlengths, to receive them at the location of the concave corners, so as to have an inner volume that is thermally insulated from the outside.

Thus, insulation is combined with production and operation ergonomics.

Another assembly that includes the following is also provided:

the same articulated panel, thus with all or some of its characteristics, at least one structure provided with a peripheral wall and having at least one interior volume, which includes at least one of the following:

a refrigerant fluid or a heat transfer fluid capable of circulating in said volume(s) under the action of circulation means, elements for storing and releasing thermal energy, at least one element to be maintained at a certain temperature, and/or at least one element releasing heat, at least one layer containing a PCM installed in the peripheral wall or around said peripheral wall, retaining spacers laterally interposed between said peripheral wall and a peripheral sleeve, the protrusions delimiting, between one another, laterally and around the peripheral wall, open spaces in which are arranged the pockets of the articulated panel, so that the peripheral sleeve extend around said panel.

This again facilitates setting up and retaining the parts that constitute this assembly and combine insulation with production and operation ergonomics.

For any purpose, it is specified that a phase change material—or PCM—designates any material capable of changing physical state within a restricted temperature range. Heat transfer (or thermal transfer) can be achieved by using the Latent Heat (LH) thereof: the material can store or transfer energy by simple change of state, while maintaining a substantially constant temperature, that of the change of state.

Concerning the embodiment of the spacers, and for the purposes already mentioned:

the spacers are hollow and receive the tubular parts of the panel, and/or, the peripheral wall has external clamps, as spacers, on which the tubular parts are installed.

The above term "sleeve" covers both structures that are at least open at one end, such as the one hereinafter referred to as 38, and the structures forming a housing, for example two complementary half-shells.

Preferably, the retaining protrusions are thermally insulating and include for this purpose a layer of thermally insulating material (which may be a VIP construction).

BRIEF DESCRIPTION OF THE DRAWINGS

The invention will be better understood and other further characteristics, details and advantages thereof may appear upon reading the following description given by way of non-limiting example and in reference to the appended drawings, wherein:

FIG. 9 schematically shows a flexible internal structure of thermally insulating material;

FIG. 10 is a mounting scheme of the peripheral insulation of a structure to be isolated; and FIG. 11 schematically shows part of an articulable panel within a rigid wall.

DETAILED DESCRIPTION OF THE INVENTION

Figure 1:
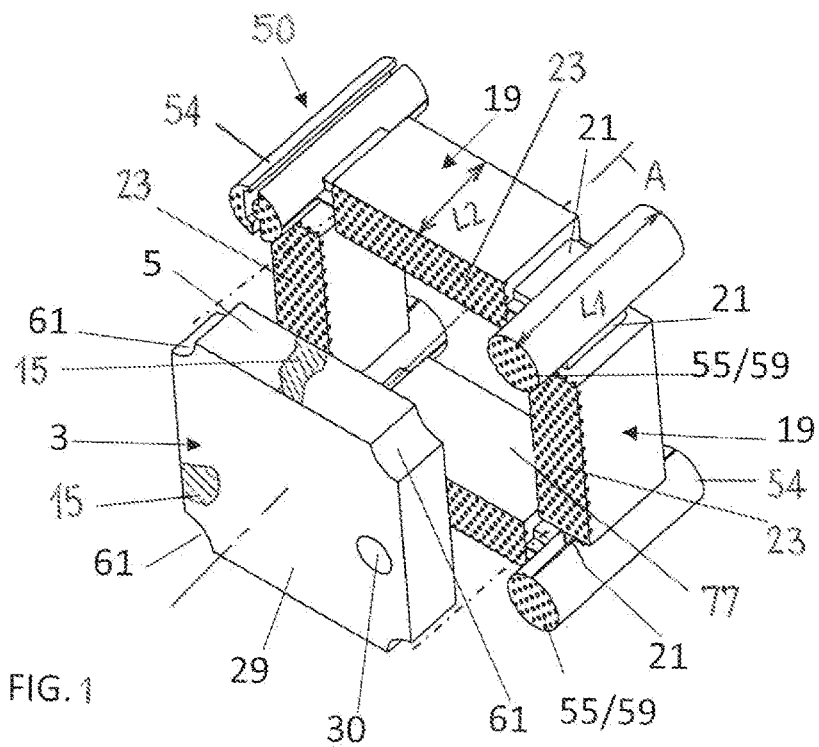
FIG. 1 schematically shows a cooperation via tubular parts, or clamps, for positioning between a peripheral wall to insulate and peripheral insulating pockets.

Particularly FIG. 1 shows pockets 19 continuously gathered, defining together, an articulable panel 50 that can:

typically, in an operational state, be closed on itself (as illustrated) thus to be arranged, for example, around a wall 5 to be insulated, and be deployed substantially flat, for example to be stored and in a state that may be non-operational (see FIGS. 2 to 5).

The insulating pockets 19 follow one another continuously by being linked two by two by flexible intermediate portions 21 where two successive pockets can be articulated with one another.

And tubular parts (whether their cross-section is circular or not) defined internally and individually by a winding 55 or a bulged portion 59 are defined between two articulation areas 21.

Figure 2:
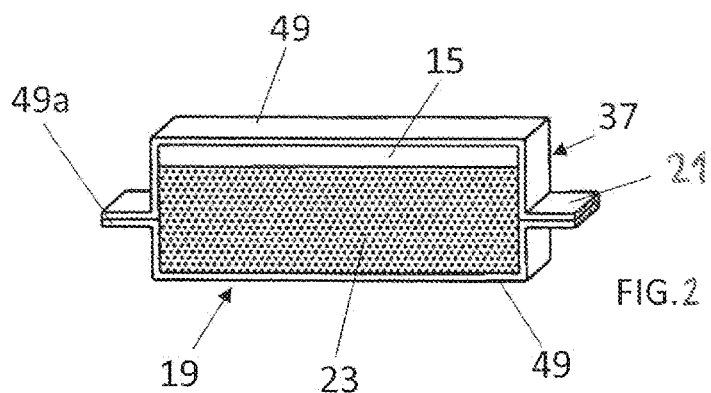
FIGS. 2 and 3 schematically show two possible structures of insulating pockets in a cross-section and in a local view (to be extended on either side)
Figure 3:
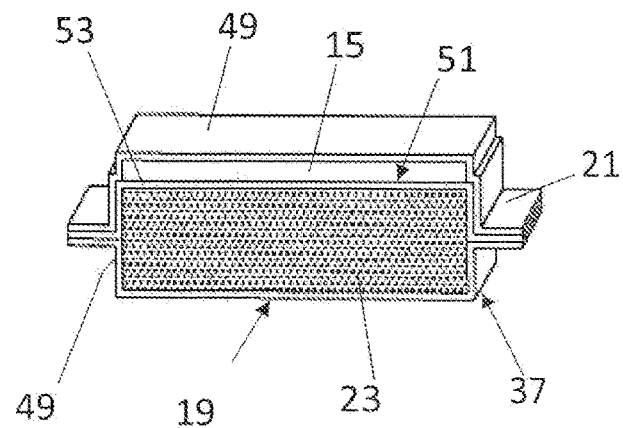

FIGS. 2 and 3 schematically show a favourable embodiment of these pockets and intermediate portions 21. Thus, even if only one pocket 19 is shown, the model merely needs to be reproduced on either side to continue the structure, as shown in the examples in FIGS. 4 to 7.

It can be seen that in these preferred embodiments, each pocket 19 with a VIP construction must comprise:

an element made of a thermally insulating material 23, which will thus be porous in this case, accounting for placement under vacuum in the example, and at least one closed outer enclosure 37 that contains said thermal insulation.

This outer enclosure 37 may consist of at least one flexible or deformable sheet 49.

The following two cases in particular are considered:

a) either said flexible sheet 49 is sealable (thermally/chemically, in 49a, around the pocket) and impervious to the porous material 23 and to air (or even to water), so that an air gap prevailing in the enclosure 37, a so-called vacuum insulation panel (VIP) is thus defined, as shown in FIG. 2 (where the sheet 49 is also impervious to an affixed PCM, b) or the second thermally insulating element 23 is contained within a second closed enclosure 51 with a flexible sheet 53 that is sealable and impervious to the porous material and to air (or event to water), so that an air gap prevailing in the second enclosure, a so-called vacuum insulation panel (VIP) is thus defined, as shown in FIG. 3.

As shown schematically in FIGS. 2, 3, 6, and 7, at least one first element or one first layer 15 containing a PCM could therefore be installed next to the thermal insulator 23.

Figure 6:
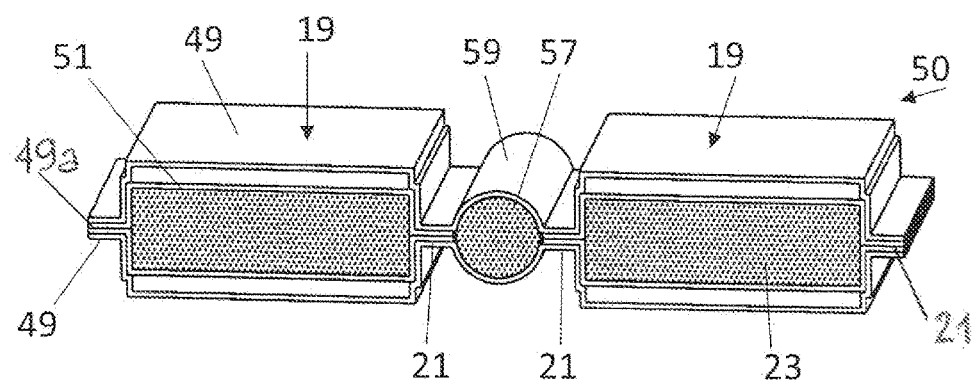
Figure 7:
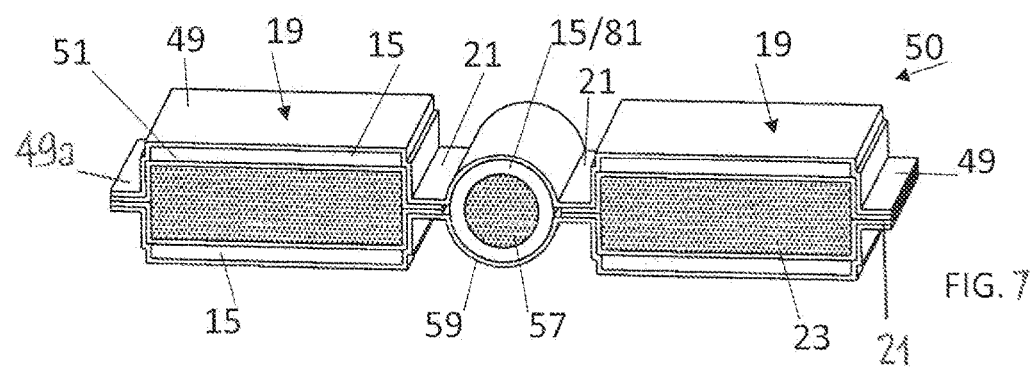

It should be noted that two layers 15 containing one or several PCMs could even (as shown in FIGS. 6 and 7) be installed on either side of the layer of porous material 23, or even no such layer, in particular if it is only provided in the peripheral wall 15 to be wrapped and protected through the panel 50, as shown in FIG. 1.

The insulating material 23 may be glass wool, a polyurethane or polyisocyanurate foam, or even more preferably a porous thermally insulating material.

This insulator 23 could also be composed preferably of a nanoporous material (with a nanostructure, such as a silica powder or an aerogel or its pyrolate, such as a silica aerogel), therefore preferably confined in a flexible sheet 49 or 53, which will not let through any water vapours or gas. The VIP got will be emptied of the air it contains to obtain, for example, a pressure of a few millibars, and then may be sealed. Typically, the thermal conductivity $\lambda$ of such a VIP will be 0.004/0.008 W/m·K at atmospheric pressure and at 20° C. The use of insulating panels under vacuum should allow for a thermal resistance R=5 m$^2$·K/W to be achieved with only 35 mm of insulating material.

A possible composition of the material 23 is the following: 80-85% of silica dioxide (SiO2), 15-20% of silicon carbide (SiC) and possibly 5% of other products (binder/fillers). A thickness (e) of 0.4 to 3 cm is possible. Examples, that can be applied here, of VIP and super-insulating material are furthermore provided in PCT/FR2014/050267 and in WO2014060906 (porous material), respectively.

The solutions presented above must enable, in an acceptable volume and weight in particular by aeronautical or automotive manufacturers, rapid storage of an available thermal energy after approximately 6-10 minutes, the retention of said energy for 12 to 15 hours, before the rapid release thereof, typically a few minutes (in particular less than 2-3 minutes), for example to an engine during a cold start phase.

The flexible sheets 49, 53 of the VIP may typically be made in the form of a multilayer film comprising polymer films (PE and PET) and aluminium in, for example, laminated (sheet of thickness of around ten micrometres) or metallised (vacuum deposition of a film of a few tens of nanometres) form. In case b) above where there is a double sheet: inner 53 and outer 49, the sheet 49 may, however, therefore only be a simple polymer film, such as a PE 0.05 to 0.2 mm thick, the purpose of this outer sheet 49 could then only be to create a simple bag for containing/joining together the elements of the panel 50 to be gathered together.

Also note that the/each enclosure 37, 51 may typically be formed of one or two sheet(s) installed on either side of at least the material 23 and sealed to it or together, peripherally at 49a, and continuously so over the entire periphery of the enclosure under controlled atmosphere.

Whatever the case may be, an advantage of the sheets directly in contact with one another at the location of the intermediate portions 21, as illustrated, if there are several, (or of the sheet if it is unique) is that advantage can be taken of the physical continuation thereof at the location of the portions 21 intended to space the pockets 19 to create an articulation area therein.

However, the simple use of said flexible sheet(s) would create a discontinuity of thermal insulation between the two consecutive pockets 19 thus joined.

And yet, in some cases, the intermediate portions 21 could have significant surfaces that are all the more troublesome in terms of thermal bridges; but it may also be necessary to place a panel 50 or a sleeve in support, for example to position same correctly in relation to the environment thereof.

All the more in these cases, a benefit will be found in that a tubular part 54 (whether its cross-section is circular or not), defined internally by a winding 55 or a bulged portion 59, is defined between two articulation areas 21 (each formed by the aforementioned flexible sheet(s) applied against one another), each area being itself joined laterally (i.e. at a distance) on one side to the pocket 19 concerned, this regularly or not in the chain, as shown in FIGS. 1 and 5 to 7.

Each winding 55 is preferably a thermal insulator made as a blanket. A nano-structured or nanoporous material, such as a silica aerogel, could be suitable. It may, for example, be the blanket flexible product known as Spaceloft®, a SIAP (Super Insulation at Atmospheric Pressure) proposed by the company ISOLProducts with a thermal conductivity: $\lambda$=0.0044 to 0.021 W/m·K at atmospheric pressure and at 20° C.

Moreover, each element 55, 59 is preferably wrapped in the aforementioned flexible sheet(s) (to keep a VIP construction). In addition or alternatively, this or these aforementioned flexible sheet(s) gathering two successive pockets 19 would therefore wrap, directly or with interposition of a PCM layer 15, a porous thermally insulating material 57, which is preferably different from the thermally insulating material 23 of the or of each pocket.

The windings 55 and the bulged portions 59 preferably has a convex outer surface. This may therefore in particular allow a support against complementary external positioning surfaces 61 (see FIGS. 1 and 8) formed locally around a said peripheral wall 5 or the edge of an attached cover and/or bottom 71, 73, these surfaces 61 being concave, therefore each in the form of a clamp, if the portions 59 and/or the wrapped windings 55 are externally convex, as shown schematically in FIG. 8.

The outer surfaces 61 may also in particular be located at the location of concave or convex corner areas (see illustrations), to then combine articulation and mechanical fixing, in the retaining or positioning direction. Convex spherical or cylindrical shapes should be useful, but for example a shape consisting of pillars with a rectangular cross-section is also possible.

Parallel to the axis A around which is wound the articulated panel 50, the bulged portions 54 with structure 55 or 59 again have a first length $\underline{L1}$ greater than a second length $\underline{L2}$ of the pockets 19, so that the bulged portions thus have over-lengths 69.

This may be useful for cooperating with the bottom 71 and/or the cover 73, in this case with concave (or hollow) corners 61, placed on either side, at the end of these over-lengths, parallel to their general direction of extension A, in this case to receive them at the location of these concave angles 61, so as to obtain an inner volume 77 thermally insulated from the outside and where, for example, a structure 3 with a peripheral wall 5, to be thermally insulated (such as a storage battery or a medicine box), will have been placed.

Individually, the bottom 71 and/or cover 73 will each incorporate or be doubled by a thermal insulator 23, preferably in the form of a pocket 19 under a controlled atmosphere.

Such a solution is light, easy to assemble/disassemble, and thermally efficient.

Both in the solution with winding(s) 55 and in the one with bulged portion(s) 59, the intermediate portions 21 are not fully thermally insulating.

Figure 4:
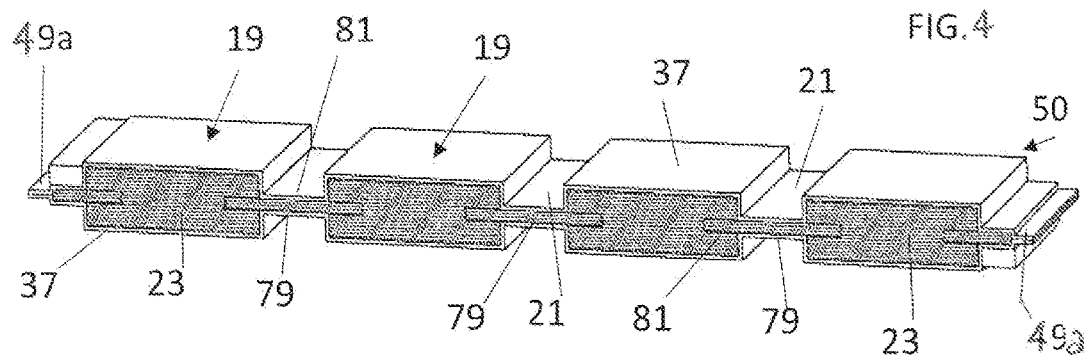
FIGS. 4 to 7 schematically show, once again in a cross-section along partial strips of varying lengths of alternative embodiments of said pockets, in this case with intermediate portions of articulation, FIG. 8 schematically shows an alternative or an addition to the solution shown in FIG. 1, with an articulable panel in a closed state.
Figure 5:
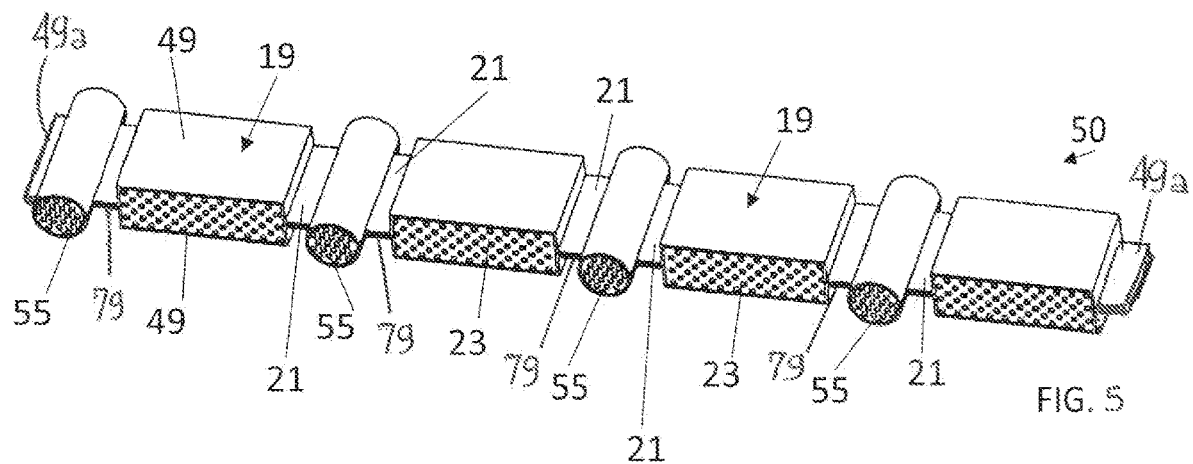

It may however be desirable to combine the functions of articulation between pockets 19 and of thermal insulation without, or with few, thermal bridges, the interest of the solution whose principle is shown schematically in FIG. 4 being noted in relation to these questions of positioning or relative mechanical fixing. However, at the place where the intermediate portions 21 are located, the illustration in FIG. 4 must be imagined with windings 55 or bulged portions 59, even if they are not shown.

In FIG. 4, the intermediate portions 21 are defined by at least one structure 79 with thermally insulating material 81 (preferably porous so as to be incorporated an overall VIP structure), providing a continuity of thermal insulation between said two pockets. The material 81 may be identical to the porous thermally insulating material 57, since it is preferably flexible to achieve the desired articulation.

In the example of FIG. 4, the porous material (in this case, in the form of plates) 81 of each flexible structure 79 that extends along the thickness between the flexible sheet(s) 49 of the enclosure 37, is interrupted in the porous thermally insulating material 23, which fills the pockets 19. There could however be continuity within it.

Because they are thicker than the impregnated fabrics, e.g. more than 2.5 to 3 times thicker, and for example formed in a block, as illustrated, the pockets 19 with thermally insulating material 23 will typically be stiffer than the flexible articulation structures 79 or the bulged portions with structures 55 or 59.

So that the panel 50 thus formed acquires the VIP constitution thereof, under partial vacuum, of course such a vacuum will be created, with sealing, after the layers or plates of porous material 23, 81 have all been enveloped by the sealed flexible sheets 49. And this seal, which is continuous along the entire periphery, will preferably be unique at 49a for the same panel 50, given that there will preferably be no seal where the intermediate portions 21 are located. One and the same vacuum, shared by all the components 19, 55 and 59, 21, will then flatten the enclosure 49 or 51 on itself.

As shown schematically in FIG. 9, to produce the structures 79, or even 55/59, it may be possible to use a flexible support made of a polymer mesh of a few mm thick impregnated with an aerogel 81, for example silica, or the pyrolate thereof (pyrolyzed aerogel, it being specified that said alternative pyrolate applies to each case of the present description wherein a porous thermally insulating material is concerned). The flexible support 83 will favourably be formed of a raw weft (e.g. an organic or inorganic woven or non-woven fabric), such as polyester or polyamide impregnated with aerogel insulating particles (e.g. fractioned fine monolithic) wedged between the fibres. which will allow for adequate flexibility to be preserved.

For the record, an insulation structure such as the one presented above 50 having a nanoporous aerogel or the pyrolate thereof as core material may have a thermal conductivity lower than 10 mW·m−1·K−1 at an internal pressure of 2 to 5 to $10^{-3}$ Pa. The negative pressure within the pockets, or even within the portions 21, may be that usual for VIPs: $10^{-2}$ to $10^{-3}$ Pa.

In connection with FIGS. 2, 3, 6, and 7 (which obviously does not require this), it will also be noted, as already mentioned, that it is possible for at least some pockets with a VIP construction and/or areas with intermediate portions to contain at least one PCM.

If there are two layers of the material, in locations where both layers exist, the second layer will be arranged around the first layer, with the material 23 being interposed between the two. It will thus be possible to arrange for an excessively cold or hot external temperature to interfere only slightly with that in an interior volume 77 to be protected. The first layer can be defined to smooth out the internal variations of temperature in this volume. The first layer will have a first temperature at which it changes state, the second layer having a second one that is different.

If there is only one layer of this material 15, it will therefore be favourably surrounded by the layer of chosen thermally insulating material.

It should also be noted that the pockets 19 will not necessarily be strictly flat. Thus, a curved shape is possible and may be achieved by shortening the length of the sheet of the enclosure 37 on one side in relation to the length of the sheet on the other side. Once sealed, the pocket will bend naturally under the mechanical stress exerted.

An application other than on a unit such as a store-exchanger, as in the case of FIG. 1, is schematically shown in FIG. 10 which shows the external lateral conditioning of an element 100, which can be a heat exchanger containing an internal exchange chamber 77. Under the action of means 11 for circulating fluid(s), which may comprise a pump and/or a fan, a first refrigerant fluid or heat transfer fluid 9a (such as a liquid to be cooled) can circulate within the interior volume 7, in this case of the exchanger 100, in a heat exchange relationship with a second fluid 9b (such as air), where the two fluids do not mix. The dotted lines show that they come out of the exchanger, typically to flow into a circuit that is external to the element 100 (e.g. a circuit for cooling the hydraulic fluid in a vehicle).

Additional retaining spacers or retaining protrusions 22a, 22b, in this case fixed with the peripheral side wall 5 of the element 100, delimit between each another, two by two, laterally and thus around the peripheral wall, the open spaces 24 in which are installed a panel 50 with pockets 19 with a VIP structure each containing at least one porous thermally insulating element 23.

A layer containing a PCM may have been arranged either in a peripheral slot of the wall 5 itself, or around this wall; typically in the pockets 19, with then are easier to implement and have an increased thermal efficiency due to the double PCM/insulator layer.

Stabilizing corners each formed of a said tubular portion 549 carrying a material 23 may complement the retaining protrusions 22a, 22b to properly stabilize the pockets 19 all around the peripheral side wall 5.

Thus, said tubular portions may form at least part of these spacers which are adapted to reserve a space for housing the pockets 19.

A sleeve 38 (consisting of one or several parts) extends closely around the spacers and the thermally insulating elements 23 with a VIP construction, so as to retain these in the spaces 24.

FIG. 11 is intended to schematically show the fact that an articulable panel 50 could be incorporated into the wall 85 of a part 87.

The wall 85 may be made of plastic and the panel 50 may be embedded, by molding, in this wall. In particular, the tubular portion 54 can be found at the corners interposed between two pockets 19. The ability to articulate the panel 50 makes it easy to place it in the mold.

The invention claimed is:

1. An articulating panel comprising, integrated together in one piece by at least one gas barrier flexible sheet, a series of pockets:
    within which there is one of an atmosphere having a pressure less than $10^5$ Pa, and an atmosphere of a gas, different from air, having a thermal conductivity lower than 26 mW/m·K,
    which individually contain at least one thermally insulating material, and
    which are longitudinally joined together by intermediate articulating portions such that adjoining pockets are configured to articulate with respect to each other and folded one in direction to the other,
    wherein at least some of the intermediate articulating portions comprise:
    a part defined by at least one of a thermally insulating winding and a bulged portion, the part enclosing a thermally insulating material in a tubular chamber under said atmosphere, and
    two portions of said at least one gas barrier flexible sheet, each portion being longitudinally interposed between said part and at least one of said pockets.

2. The articulating panel of claim 1, wherein the pockets and the parts are under vacuum and said thermally insulating materials contained therein are porous.

3. The articulating panel of claim 1, wherein the pockets, the parts and said portions of said at least one said gas barrier flexible sheet interposed between a respective tubular part and a respective pocket are globally under the same atmosphere, with a single seal, at the outer periphery of the panel, only.

4. The articulating panel according to claim 1, wherein the pockets are individually under said atmosphere and each two successive pockets are connected by said portions of said at least one gas barrier flexible sheet, which encircles and binds together the pockets, the parts, and said interposed portions of said at least one gas barrier flexible sheet.

5. The articulating panel according to claim 1, wherein the series of pockets, the respective parts and said at least one gas barrier flexible sheet are integrated together, so that the articulating panel is a one-piece panel.

6. The articulating panel according to claim 1, wherein the pockets of the series are covered by the same continuous sheet.

7. The articulating panel of claim 1, wherein the two portions of the at least one gas barrier flexible sheet are arranged to enclose said part and at least one of said pockets.

8. An assembly comprising:
the articulating panel of claim 1, wherein the parts have, along an axis around which the panel is wound on itself, overlengths having a length over than a length of the pockets, and
a bottom and a cover, each of which incorporates or is doubled by a said thermally insulating material and with concave corners engaged with said overlengths, to receive them at the location of said concave corners, so as to have an inner volume that is thermally insulated from the outside.

9. An assembly comprising:
the articulating panel of claim 1; and
a housing provided with an elongated peripheral wall and a plurality of retaining spacers or retaining protrusions extending from an exterior surface of the housing, said housing having an interior volume in which is contained at least one of the following:
a refrigerant fluid or a heat transfer fluid capable of circulating in said interior volume under the action of circulation means,
at least one element to be maintained at a certain temperature,
at least one element releasing heat,
wherein each of said plurality of retaining spacers or retaining protrusions has a concave surface defining a depression in which one of said part of the articulating panel is received, wherein said plurality of retaining spacers or retaining protrusions are successively disposed peripherally between two successive portions of the peripheral wall and delimit peripherally between one another an open space in which is arranged at least one of said pockets, and
wherein the assembly further comprises a phase change material arranged:
either within the peripheral wall, in front of the open space, or
around said peripheral wall, in said open space.

10. The assembly of claim 9, wherein the at least a first and at least a second retaining spacers or retaining protrusions are fixed with the peripheral wall by cooperating shapes.

11. The assembly according to claim 9, wherein the housing comprises:
a first side and second side opposite the first side,
said interior volume which extends between the first and second side, the first and second sides having first and second perimeters, and
a side wall having four sides that connects the first and second perimeters and encloses the interior volume.

12. The assembly according to claim 9, wherein the interior volume contains the at least one element to be maintained at a certain temperature, which is an electrical battery.

13. An articulating panel that can be closed on itself and comprising a series of pockets having an internal pressure less than $10^5$ Pa:
which individually contain at least one thermally insulating material, and
which are longitudinally joined together by flexible intermediate portions such that adjoining pockets are configured to articulate with respect to each other and folded one in direction to the other,
wherein at least some of the intermediate articulating portions comprise:
a part defined by at least one of a thermally insulating winding and a bulged portion the part enclosing a thermally insulating material in a volume under vacuum, and
two portions of at least one gas barrier flexible sheet enclosing said part and at least one of said pockets, each portion being longitudinally interposed between said part and said pocket.

14. The articulating panel according to claim 13, wherein the series of pockets, the respective tubular parts and said at least one gas barrier flexible sheet are integrated together, so that the articulating panel is a one-piece panel.

15. The articulating panel according to claim 13, wherein the pockets of the series are covered by the same continuous sheet.

16. An articulating panel that can be closed on itself and comprising a series of pockets:
which are filled with a gas, different from air, having a thermal conductivity lower than 26 mW/m·K,
which individually contain at least one thermally insulating material, and
which are longitudinally joined together by flexible intermediate portions where adjoining pockets are configured to articulate with respect to each other and folded one in direction to the other,
wherein at least some of the intermediate articulating portions comprise:
a part defined by said at least one of a thermally insulating winding and a bulged portion, the part enclosing a thermally insulating material in a volume containing said gas, and
two portions of at least one gas barrier flexible sheet, each portion being longitudinally interposed between said part and said pocket.

17. The articulating panel according to claim 16, wherein the series of pockets, the respective parts and said at least one gas barrier flexible sheet are integrated together, so that the articulating panel is a one-piece panel.

18. The articulating panel according to claim 16, wherein the pockets of the series are covered by the same continuous sheet.

19. The articulating panel of claim 16, wherein the two portions of the at least one gas barrier flexible sheet are arranged to enclose said part and at least one of said pockets.

* * * * *